United States Patent
Lee et al.

(10) Patent No.: US 12,432,166 B2
(45) Date of Patent: Sep. 30, 2025

(54) METHOD, SERVER, AND USER TERMINAL FOR PRESENTING CONTENT THROUGH CHAT ROOM

(71) Applicant: KAKAO CORP., Jeju-si (KR)

(72) Inventors: Jae Seon Lee, Seongnam-si (KR); Ga Hee Jeong, Seongnam-si (KR); Ji Sun Lee, Seongnam-si (KR); Eun Jung Ko, Seongnam-si (KR); Hye Ryeon Lee, Yongin-si (KR); Yeo Seong Yoon, Yongin-si (KR); Hyun Soo Park, Seongnam-si (KR); Sung Jin Park, Seoul (KR)

(73) Assignee: KAKAO CORP., Jeju-si (KR)

( * ) Notice: Subject to any disclaimer, the term of this patent is extended or adjusted under 35 U.S.C. 154(b) by 16 days.

(21) Appl. No.: 18/521,687

(22) Filed: Nov. 28, 2023

(65) Prior Publication Data

US 2024/0187359 A1 Jun. 6, 2024

(30) Foreign Application Priority Data

Dec. 1, 2022 (KR) .................. 10-2022-0166084

(51) Int. Cl.
*G06F 15/16* (2006.01)
*G06F 16/9538* (2019.01)
*H04L 51/04* (2022.01)

(52) U.S. Cl.
CPC .......... *H04L 51/04* (2013.01); *G06F 16/9538* (2019.01)

(58) Field of Classification Search
CPC ......... H04L 51/04; H04L 51/02; H04L 51/10; H04L 51/18; G06F 16/9538;
(Continued)

(56) References Cited

U.S. PATENT DOCUMENTS

| | | | |
|---|---|---|---|
| 6,564,244 B1 * | 5/2003 | Ito | G06Q 10/10 709/224 |
| 8,443,041 B1 * | 5/2013 | Krantz | H04L 51/04 709/224 |
| 2003/0037103 A1 | 2/2003 | Salmi et al. | |
| 2008/0320085 A1 * | 12/2008 | Bouilloux-Lafont | H04N 7/17318 348/E7.071 |

(Continued)

FOREIGN PATENT DOCUMENTS

| | | |
|---|---|---|
| JP | 2004-531798 A | 10/2004 |
| JP | 2005-524302 A | 8/2005 |

(Continued)

OTHER PUBLICATIONS

Office Action in Japanese Patent Application No. 2023-199163 (Issued Date: Nov. 26, 2024).

(Continued)

*Primary Examiner* — John B Walsh
(74) *Attorney, Agent, or Firm* — Knobbe, Martens, Olson & Bear, LLP

(57) ABSTRACT

Proposed is a method in which a server presents content through a chat room. The method may include acquiring information about a keyword or theme of the content, information about a condition for presenting the content, and information about the chat room, wherein the chat room is related to the keyword or theme and a plurality of users are able to participate in the chat room. The method may also include providing the chat room to a user terminal in association with the information about the keyword or theme of the content. The method may further include searching for the content in a content pool based on the keyword or theme, and when the condition for presenting the content is satisfied, presenting at least some items of the searched content to the user terminal through the chat room.

16 Claims, 9 Drawing Sheets

(58) Field of Classification Search
CPC ........... G06F 16/90332; G06F 16/9035; G06F 16/955; G06Q 50/10; G06Q 50/50
See application file for complete search history.

(56) References Cited

U.S. PATENT DOCUMENTS

| | | | | |
|---|---|---|---|---|
| 2013/0174061 | A1* | 7/2013 | Loganathan | H04L 51/04 715/758 |
| 2014/0026079 | A1* | 1/2014 | Graham | H04L 12/1813 715/758 |

FOREIGN PATENT DOCUMENTS

| | | |
|---|---|---|
| JP | 2014-063459 A | 4/2014 |
| JP | 2016-173818 A | 9/2016 |
| JP | 2018-524717 A | 8/2018 |
| JP | 2022-083404 A | 6/2022 |
| KR | 10-0624802 B1 | 9/2006 |
| KR | 10-1198686 B1 | 11/2012 |
| KR | 10-2016-0109897 A | 9/2016 |
| KR | 10-2020-0144721 A | 12/2020 |
| KR | 10-2022-0035549 A | 3/2022 |
| KR | 10-2022-0071487 A | 5/2022 |
| KR | 10-2022-0090304 A | 6/2022 |
| KR | 10-2022-0105017 A | 7/2022 |

OTHER PUBLICATIONS

Office Action received in Korean Patent Application No. 10-2022-0166084 dated Mar. 21, 2025.

* cited by examiner

METHOD, SERVER, AND USER TERMINAL FOR PRESENTING CONTENT THROUGH CHAT ROOM

CROSS-REFERENCE TO RELATED APPLICATION

This application claims priority to and the benefit of Korean Patent Application No. 10-2022-0166084 filed on Dec. 1, 2022, the disclosure of which is incorporated herein by reference in its entirety.

BACKGROUND

Technical Field

The present disclosure relates to a method of presenting content related to a specific keyword or theme through a chat room where a plurality of users participates.

Description of Related Technology

Due to the advancement of wireless communication technology and the widespread use of smartphones, messenger services that enable people to communicate with a variety of others without limitations of time and place have become widely popular.

SUMMARY

One aspect is a method for conveniently presenting content related to a specific keyword or theme to a user through a chat room.

Another aspect is to present content by applying a customized format based on a type of the content.

Another aspect is a method in which a server presents content through a chat room, the method including: acquiring information about a keyword or theme of the content, information about a condition for presenting the content, and information about the chat room, wherein the chat room is related to the keyword or theme and a plurality of users are able to participate in the chat room; providing the chat room to a user terminal in association with the information about the keyword or theme of the content; searching for the content in a content pool based on the keyword or theme; and when the condition for presenting the content is satisfied, presenting at least some items of the searched content to the user terminal through the chat room.

The information about the condition for presenting the content may be at least one of predetermined time information and time interval information.

The information about the condition for presenting the content may be based on occurrence, passage or termination of a predetermined event.

The information about the condition for presenting the content may relate to whether the searched content in the searching satisfies a predefined criterion.

The predefined criterion may relate to at least one of the following: a number of items, creation frequency, and importance of the searched content.

The content may correspond to one of a plurality of types, and in the presenting of at least some items of the searched content, the content may be presented through a message format determined based on a type of the content.

In the acquiring, information about the type of the content may be further acquired, and in the searching, the content may be searched further based on the type.

The chat room may be a chat room where the plurality of users are able to participate through a URL posted on the Internet, and the chat room may include a plurality of chat rooms corresponding to one URL.

The plurality of chat rooms may be determined based on a time when the plurality of users participate through the one URL or a number of participants in other chat rooms.

In the presenting of at least some items of the searched content, the content may be presented in the form of a message from a chatbot in the chat room.

The information about the chat room may include information indicating that the chat room has not been created and information about a condition for creating the chat room, and the method may further include: determining whether the condition for creating the chat room is satisfied; and when the condition for creating the chat room is satisfied, creating the chat room.

The condition for creating the chat room may relate to whether the content searched in the searching satisfies a predefined criterion.

The predefined criterion may relate to at least one of the following: a number of items, creation frequency, and importance of the searched content.

The information about the keyword or theme may include information indicating that the keyword or theme has not yet been specified and information about a condition for specifying the keyword or theme, and the method may further include: determining whether the condition for specifying the keyword or theme is satisfied; and when the condition for specifying the keyword or theme is satisfied, identifying the keyword or theme.

Another aspect is a server for presenting content through a chat room, the server including: a memory storing instructions, and a processor configured to execute the instructions to: acquire information about a keyword or theme of the content, information about a condition for presenting the content, and information about the chat room, wherein the chat room is related to the keyword or theme and a plurality of users are able to participate in the chat room; provide the chat room to a user terminal in association with the information about the keyword or theme of the content; search for the content in a content pool based on the keyword or theme; and when the condition for presenting the content is satisfied, present at least some items of the searched content to the user terminal through the chat room.

Another aspect is a method in which a user terminal receives content through a chat room, wherein the content is content searched by a server in a content pool based on a predetermined keyword or theme, the method including: displaying the chat room in association with the information about a keyword or theme of the content; participating in the chat room through a URL posted on the Internet, wherein the chat room is related to the keyword or theme of the content, and a plurality of users are able to participate in the chat room; receiving the information about the keyword or theme of the content to be presented through the chat room and information about a condition for receiving the content from the server; when the condition for receiving the content is satisfied, receiving the content from the server through the chat room; and displaying the content in the form of a message from a chatbot through the chat room.

The content may correspond to one of a plurality of types, and in the displaying, the content may be displayed based on a message format determined according to a type to the content.

Another aspect is a user terminal for receiving content through a chat room, wherein the content is content searched by a server in a content pool based on a predetermined keyword or theme, the user terminal including: a memory storing instructions; and a processor configured to execute the instructions to: display the chat room in association with the information about a keyword or theme of the content; participate in the chat room through a URL posted on the Internet, wherein the chat room is related to the keyword or theme of the content and a plurality of users are able to participate in the chat room; receive the information about the keyword or theme of the content to be presented through the chat room and information about a condition for receiving the content from the server; when the condition for receiving the content is satisfied, receiving the content from the server through the chat room; and display the content in the form of a message from a chatbot through the chat room.

DETAILED DESCRIPTION

Recently, these messenger services have evolved beyond mere communication tools and have also become platforms for sharing various types of information. For instance, users can receive information about discount promotions from online stores they are subscribed to, delivery updates for requested items, and even their banking transaction history through these messenger services.

By receiving information through these messenger service messages, the users can check messages in real-time and share various forms of information, including text, photos, and videos.

As the role of messenger services in delivering information to the users continues to expand, there is a growing demand for more effective and convenient methods for a service provider to deliver information to a user and for the user to receive the information.

Hereinafter, embodiments disclosed in the present specification will be described in detail with reference to the attached drawings. For the sake of brief description with reference to the drawings, the same or equivalent components may be provided with the same or similar reference numbers, and description thereof will not be repeated. In addition, in the following description of the embodiments, a detailed description of known functions and configurations incorporated herein will be omitted when it may impede the understanding of the embodiments.

While terms including ordinal numbers, such as "first" and "second," etc., may be used to describe various components, such components are not limited by the above terms. The above terms are used only to distinguish one component from another.

The singular forms are intended to include the plural forms as well, unless the context clearly indicates otherwise.

In this application, each of the above-described operations may be performed irrespective of the listed order, except for a case where the operations must be performed in the listed order due to a special cause-effect relation of the operations.

It will be further understood that the terms "comprises," "comprising," "includes," "including," "have" and/or "having" when used herein, specify the presence of stated features, integers, steps, operations, elements, and/or components, but do not preclude the presence or addition of one or more other features, integers, steps, operations, elements, components, and/or groups thereof.

Hereinafter, the present disclosure will be described with reference to the attached drawings.

Figure 1:
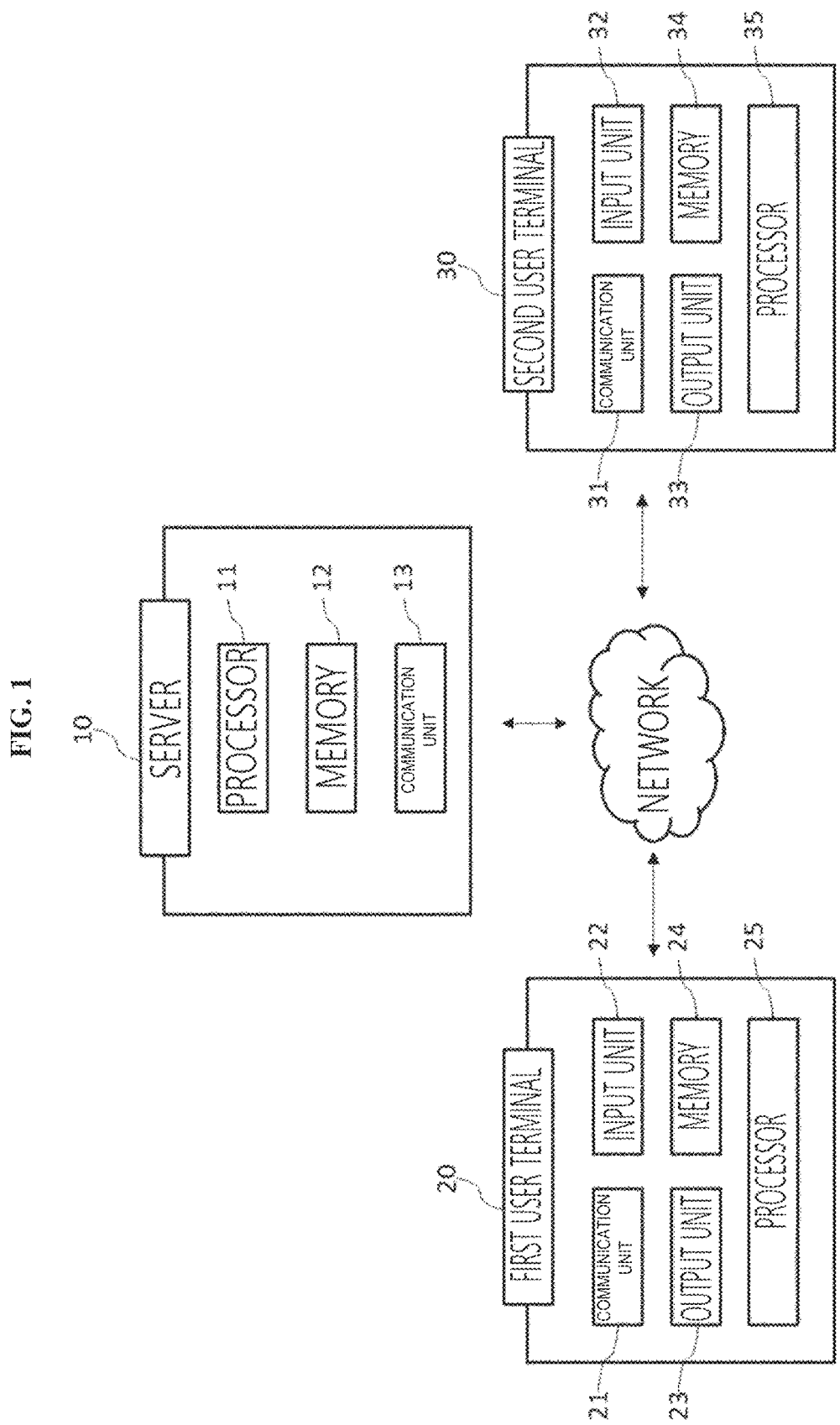
FIG. 1 is a diagram illustrating an example of a network environment according to an embodiment of the present disclosure.

FIG. 1 is a diagram illustrating an example of a network environment according to an embodiment of the present disclosure.

A network environment according to an embodiment of the present disclosure shown in FIG. 1 may include a server 10, a first user terminal 20, and a second user terminal 30.

The server 10 is a device that provides a messenger service to user terminals. The user terminals exemplified by the first and second user terminals 20 and 30 are devices that use the messenger service provided by the server 10.

The messenger service may be a service that allows a plurality of users to send or receive messages through a platform provided by the server 10. Here, a message may be understood to include all types of transmittable data, including text, photos, videos, voice files, emoticons, and link information.

Communication schemes for a network is not limited. The communication schemes may include not only a communication scheme to utilize a telecommunication network (for example, a mobile communication network, wired Internet, wireless Internet, and a broadcast network), but also a short-range radio communication scheme.

The server 10 may be implemented as a computer device or a plurality of computer devices that provide commands, codes, files, content, services, and the like. The server 10 may be a server 10 capable of transmitting and receiving information through communication with a user terminal via a network.

The server 10 may include a processor 11, a memory 12, and a communication unit 13.

The processor 11 may control the overall operation of the memory 12 and the communication unit 13 to provide the messenger service to a user terminal.

The memory 12 serves as a storage medium and may store a number of application programs running on the server 10, and data and commands for operation of the server 10. In one embodiment, an application associated with the messenger service may be stored in the memory 12.

The memory 12 may be provided in the form of any of various hardware storage devices such as an ROM, an RAM, a flash drive, a hard drive, etc. or may be provided in the form of a web storage.

The communication unit 13 may communicate with a user terminal in a wired or wireless manner through a network.

The server 10 of the present disclosure presents content through a chat room where a plurality of users participate. Specifically, the server 10 acquires information about a keyword or theme of content to be presented through a chat room, information about a condition for presenting content, and information about the chat room. Then, the server 10 searches for content in a content pool based on the acquired keyword or theme. The server 10 determines whether the above-described condition for presenting content is satisfied. When the condition for presenting content is satisfied, the server 10 provides at least some items of the searched content through the chat room. The content may be presented in the form of a message from a chatbot in the chat room.

Here, the chat room is a chat room where a plurality of users can participate. The chat room includes a one-on-one chat room where two users can participate and a group chat room where three or more users can participate. Hereinafter, for convenience of explanation, it will be assumed that a chat room is a group chat room. The group chat room refer to a chat room where three or more users can participate, but does not necessarily imply that there are always three or more participants. Therefore, there may be 0, 1, or 2 participants in a group chat at a certain point in time.

In addition, a chat room may be a general chat room where users can participate through an application associated with the chat room service, and a chat room where users can participate through a URL posted on the Internet, such as an open chat (a registered trademark of Kakao Corporation), for example.

A chat room may be about a specific keyword or theme. The keyword or theme of the chat room may be explained through the title, description, or notice message of the chat room. In addition, if the chat room is a chat room that allows participation through a URL, the keyword or theme of the chat room may be described in relation to the URL. For example, the keyword or theme of the chat room may be displayed on an interface associated with the URL where to join the chat room.

A chat room may refer to one chat room or a plurality of chat rooms. When a chat room includes a plurality of chat rooms, the plurality of chat rooms may be different chat rooms associated with the same keyword or theme. Specifically, the plurality of chat rooms may have the same keyword or theme but different compositions of participants. Therefore, a message displayed in a specific chat room may not be displayed in other chat rooms.

When the chat room includes a plurality of chat rooms, the plurality of chat rooms may correspond to one URL. In other words, even if different users are participating in different chat rooms, the users may join the different chat rooms through the same URL. Based on a condition at the time a plurality of users wishes to participate in a chat room through a URL or other conditions, the server 10 may select one of a plurality of chat rooms so that a user can participate in the selected chat room.

Specifically, depending on the maximum capacity of each chat room at the time when the user wants to participate in a chat room via a URL, the choice of which chat room to join may vary. For example, let's assume that a chat room includes a first chat room and a second chat room, with each chat room having a maximum participant capacity of 100. In this case, if the number of participants in the first chat room reaches 100 after a first user participates in the first chat room through a specific URL, and if a second user later requests chat room participation through the same specific URL, the server 10 may allow the second user to participate in the second chat room. Here, the second chat room may be newly created after the first chat room is full or may be a previously created chat room.

In addition, specifically, the server 10 may sequentially assign users participating in a chat room to another chat room through a URL. For example, if the first user wants to participate in a chat room through a specific URL at a first point in time, the server 10 may allow the first user to participate in the first chat room. Then, if the second user wants to participate in a chat room through the specific URL at a second point in time immediately after the first point in time, the server 10 may allow the second user to participate in the second chat room. In this manner, the server 10 may ensure a relatively equal number of participants in various chat rooms of the same keyword or theme.

As described above, when a chat room to be presented with content includes a plurality of chat rooms corresponding to one URL, the content according to the present disclosure may be presented equally to the plurality of chat rooms. However, in some cases, depending on settings by a messenger administrator, content provision service administrator or chat room operator, the condition for presenting content and content type may be set differently for individual chat rooms.

Here, the content may include all transmittable data such as text, photos, videos, voice files, emoticons, and link information. The content may be presented in the form of a message in a chat room.

The content may be about a specific keyword or theme. The theme of the content may refer to something related to the content's substance, while the keyword of the content may refer to a word included in the title or other related words used to search for or navigate the content.

The keyword and theme of the content may be set to be the same or similar or may be set differently in some cases. For example, even though the content is about a specific topic, if there is a more appropriate keyword for searching for or navigating the content than the theme, a keyword different from the theme may be set. For example, in the case of content of which theme is "New Sonata", the keyword may be set to "DN9," which is the model name of the car, for improved search accuracy.

As such, the keyword or theme of content may be the same as the keyword or theme of a chat room or may have a certain relationship therewith.

The content may be news articles, videos, images, and posts about a specific keyword or theme. For example, let's assume that the specific keyword or theme mentioned is the K baseball team. In that case, the content may be news articles, videos, images, and posts about the K baseball team.

The first user terminal 20 refers to a user terminal that receives content from the server 10 through a chat room. Specifically, the first user terminal 20 may participate in the chat room through an application associated with a chat room service or through a URL posted on the Internet. The user terminal receives information about a keyword or theme of the content to be presented through the chat room and information about a condition for receiving content from the server 10. In addition, when the condition for receiving content is satisfied, the user terminal receives the content from the server 10 through the chat room and displays the content on the chat room.

The first user terminal 20 may include a communication unit 21, an input unit 22, an output unit 23, a memory 24, and a processor 25.

The communication unit 21 may communicate with the server 10 or other terminals in a wired or wireless manner.

The input unit 22 may receive various information through the user's manipulation and input actions. Such input units may include a touch screen module, a keyboard, a mouse, a button, a camera, a stylus, and a microphone.

The first user terminal 20 may receive a user's interaction through the input unit 22. The interaction indicates that a user operates the input unit 22 to input information reflecting the user's selection or intention into the first user terminal 20. For example, the interaction may include touching on a touchscreen, clicking with a mouse, typing on a keyboard, providing voice input through a microphone, capturing an image using a camera, recognizing movements through a motion sensor, and the like.

The output unit 23 may output various information. The output unit 23 may be a display device, a speaker, a vibration generator, a tactile generator, etc. In some cases, the output unit 23 may be a device (e.g., Bluetooth earphone) that is connected to a user terminal through wired or wireless communication (e.g., short-range radio communication such as Bluetooth) to receive and output a signal.

The memory 24 serves as a storage medium and may store a plurality of application programs running on a user terminal, and data and instructions for operating the first user terminal 20. This memory may be provided in the form of any of various hardware storage devices such as an ROM, an RAM, a flash drive, a hard drive, etc. or may be provided in the form of web storage. In one embodiment, an application associated with a messenger service (hereinafter referred to as "application") may be stored in the memory 24.

The processor 25 may execute an application by controlling the overall operation of the communication unit 21, the input unit 22, the output unit 23, and the memory 24.

The second user terminal 30 refers to a user terminal that, like the first user terminal 20, receives content through a chat room from the server 10. In some cases, the second user terminal 30 may participate in the same chat room as the first user terminal 20 and receive and display the same content from the server 10.

Detailed components of the second user terminal 30 are substantially the same as those of the first user terminal 20. The second user terminal 30 may include a communication unit 31, an input unit 32, an output unit 33, a memory 34, and a processor 35. A detailed description of the configuration of the second user terminal 30 will be omitted in favor of the description provided for the first user terminal 20.

Figure 2:
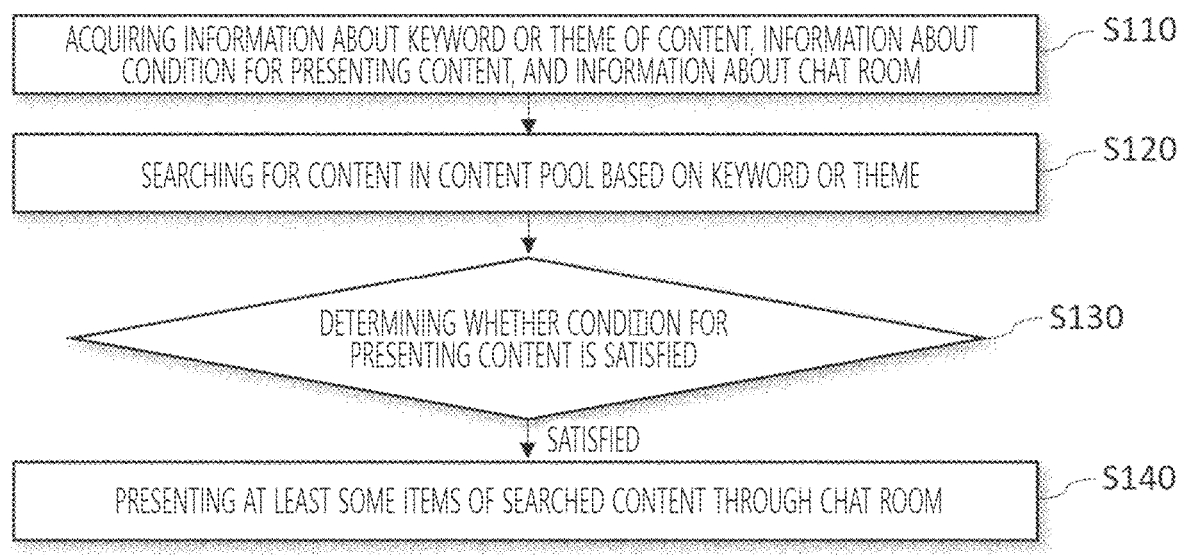
FIG. 2 is a flowchart of the operation of a server according to an embodiment of the present disclosure.

FIG. 2 is a flowchart of the operation of the server 10 according to an embodiment of the present disclosure.

Each of the above-described operations may be performed irrespective of the listed order, except for a case where the operations must be performed in the listed order due to a special cause-effect relation of the operations. However, hereinafter, for convenience of explanation, it will be assumed that the above-described operations are performed in the listed order.

In operation S110, the server 10 acquires information about a keyword or theme of content, information about a condition for presenting content, and information about a chat room.

The server 10 may acquire the information about the keyword or theme of the content, the information about the condition for presenting content, and the information about the chat room from the operator of a messenger or content provision service, the operator of the chat room, etc.

The information about the keyword or theme of the content is about the keyword, theme, topic, or substance of the content to be presented by the server 10. The information about the keyword or theme of the content may include at least one keyword, natural language, or keyword identifier.

The information regarding the condition for presenting content refers to a criterion for the server 10 to present content to a user terminal through a chat room. Specifically, the information regarding the criterion may be at least one of predetermined time information or time interval information. For example, the information regarding the criterion may include presenting the content every morning at 10 a.m., presenting the content every two hours, or the like.

In some cases, the condition for presenting content may be determined based on a predetermined event. Specifically, the condition for presenting content may be determined based on the occurrence, progression, or termination of a predetermined event. The server 10 may acquire and store information about the predetermined event in advance, and may collect the information about the occurrence, progression, or termination of the predetermined event using various methods. For example, the predetermined event may be a game of the K baseball team, and the condition for presenting content may be an elapse of 30 minutes after the K baseball team's game ends.

In some cases, the condition for presenting content may relate to whether content searched in operation S120, which will be described later, satisfies a predefined criterion. Specifically, in operation S120, the condition for presenting content may relate to at least one of the following: the number of searches, creation frequency, and importance and popularity of the searched content. Here, the importance and popularity may be content metadata given as a separate item by a content creator or content manager. In addition, in some cases, the server 10 may access the importance by referring to words that are deemed highly significant in the title or key keywords of the content (e.g., "exclusive," "breaking," and "urgent"). In addition, the popularity may be determined based on the number of views and citations of the content.

When an issue arises with content related to a keyword or theme acquired in this method, the content may be presented to a user at an appropriate point in time. For example, the condition for presenting content may be determined to be whether there have been more than 30 news articles about the keyword within 2 hours. In this case, if there have been more than 30 news articles about the keyword within 2 hours, content of the news article type may be presented to a user through a chat room.

Information about the chat room refers to identification information of the chat room to which the server 10 intends to present content. As described above, the chat room may be one chat room or a plurality of chat rooms. In addition, the plurality of chat rooms may correspond to one URL.

In some cases, information about the type of content to be provided by the server 10 may be additionally acquired in operation S110. The content may be categorized into various types. Specifically, the content may be categorized into types such as news articles, videos, images, and posts. In addition, for example, in operation S110, the server 10 may acquire information indicating that content is presented only when the content is of news article type.

In operation S120, the server 10 searches for the content in a content pool based on a keyword or theme.

The content pool refers to a browsing category where the server 10 searches for content. The content pool may be set in various ways depending on the environment or intention. For example, when the content pool is limited to a specific news article or video platform, the server 10 may search for content only in the content pool. In this case, it is possible to prevent the selection of low-quality content or duplicate content, but there is a disadvantage that the scope of information is limited. In some cases, the content pool may be set to all categories accessible through the network. In this case, there is an advantage that there is a large amount of information accessible for browsing, but a disadvantage is that low- quality content or duplicate content may be selected.

In operation S120, the server 10 may search for content based on the keyword or theme acquired in operation S110. Specifically, the server 10 may perform a search based on the keyword or theme for titles, keywords, tag information, metadata, and content substance of content within the content pool.

In some cases, the server 10 may search for content further based on information about the content type acquired in operation S110. For example, if the server 10, in operation S110, acquires information indicating that content provision is limited to news articles, the server 10 may, in operation S120, search for only content of the news article type within the content pool.

Searching for content in operation S120 may be performed by multiple steps. Specifically, the server 10 may initially select candidate contents from the content pool and then select a final content from the candidate contents.

In operation S130, the server 10 determines whether the condition for presenting content is satisfied.

The server 10 determines whether a condition for presenting the current content is satisfied based on the information about the condition for presenting content acquired in operation S110. To this end, the server 10 may refer to time information, information about a predetermined event, or information about a content search result.

In operation S140, the server 10 presents at least some items of content searched through the chat room.

The content may be presented in the form of a message from a chatbot in the chat room. The chatbot refers to an entity that initiates messages driven by a chatbot program, allowing conversational interaction in everyday language within a messenger. The chatbot is displayed as an entity with separate identification information (title or name) in a chat room, but may be a separate entity that is not a participant in the chat room. In some cases, the chatbot in a chat room may function not only as a content provider but also as a provider of general information or management information of the chat room.

In some cases, the server 10 may select and present only some items of the content searched in operation S120. The server 10 may select some items of the content searched in operation S120 by considering importance, popularity, or recent creation status.

In some cases, the server 10 may present content in a message format determined depending on a type of the content. To this end, the message format may be predetermined depending on the type of the content. For example, when the content type is news article, a message format in which multiple news articles can be most effectively delivered may be determined. In addition, when the content type is video, a message format in which a thumbnail preview of video or the like is displayed may be determined. When presenting content through a chat room in operation S140, the server 10 may present selected content by inserting the selected content into a message format determined based on the content type.

In some cases, while presenting content through a chat room, the server 10 may also provide detailed information about the corresponding content or link information that can lead to another content. Such link information may be presented in connection with an interface to a message through which another content is presented.

Hereinafter, example screens in the process of performing a method of presenting content through a chat room by the server 10 according to an embodiment of the present disclosure will be described with reference to FIGS. 3 to 7.

FIGS. 3 and 5 to 7 are example screens of a user terminal in the process of performing a method in which the server 10 presents content through a chat room. FIG. 4 is an example screen of a terminal used by a messenger administrator, content service administrator or chat room operator during the process in which the server 10 presents content through a chat room.

Figure 3:
FIG. 3 illustrates an example screen showing information about a chat room on a user terminal.
Figure 4:
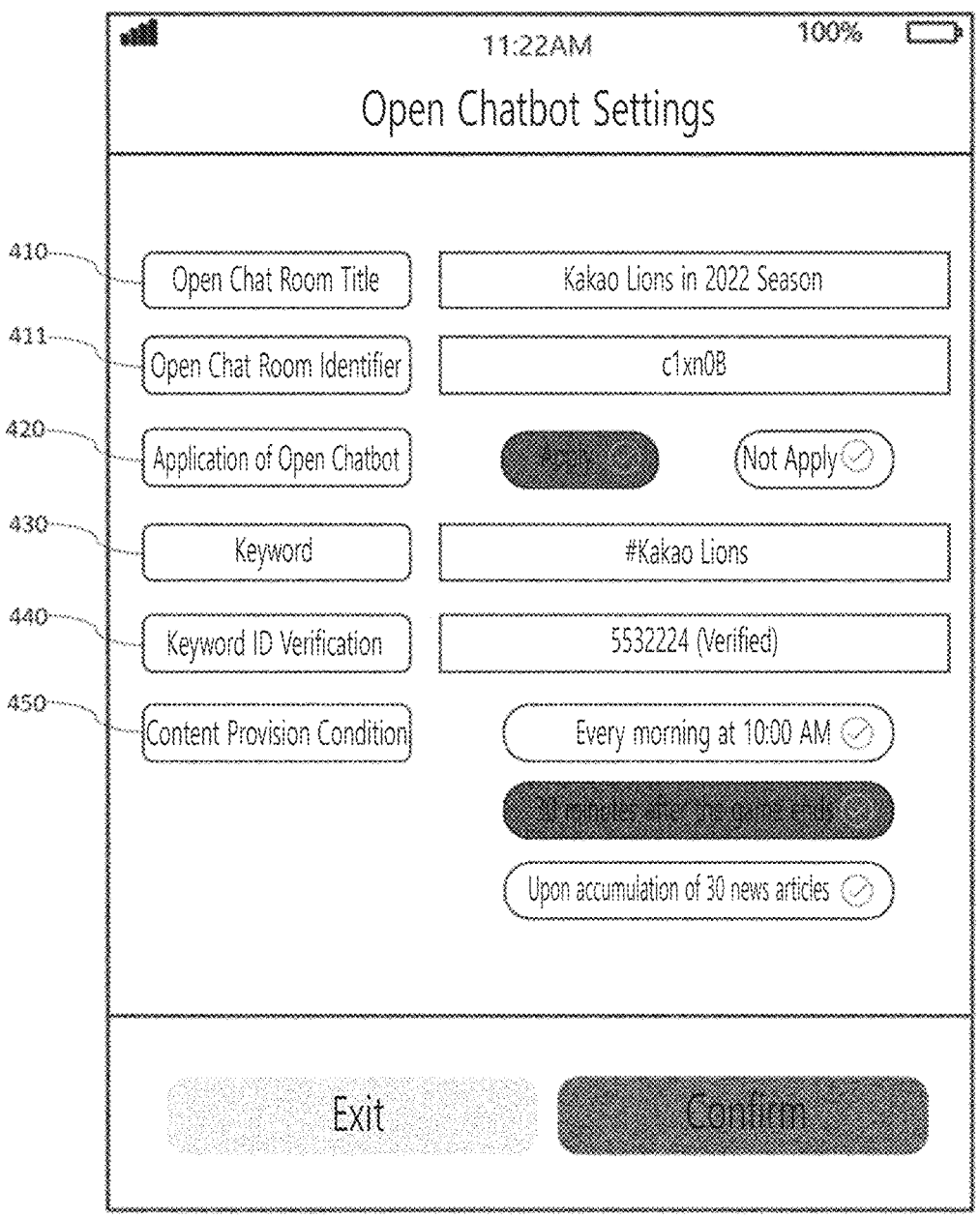
FIG. 4 illustrates an example screen for entering settings for a service of presenting content through a chat room by a chat room operator or administrator terminal.

FIG. 3 illustrates an example screen showing information about a chat room on a user terminal.

Referring to FIG. 3, the server 10 may provide information about a chat room where content can be presented to a user terminal. The chat room may be of a specific keyword or topic, and the keyword or theme may be displayed as information of the chat room. In addition, the server 10 may provide a participation interface through which users can participate in the chat room.

Referring to FIG. 3, there is a chat room 310 named "Kakao Lions in 2022 Season" related to a baseball team, and there is a participation interface 311 displayed to join the chat room. In addition, chat room information 312 displays the number of participants, the date of creation, and the like. In addition to the chat room 310 related to the baseball team, the chat room may include a chat room 320 related to international sports games, a chat room 330 related to drama, a chat room 340 related to weather or environmental situations, and the like.

The screen shown in FIG. 4 is an example screen for entering settings for a service that presents content through a chat room on a terminal of a messenger or content provision service administrator or chat room operator.

Referring to FIG. 4, the messenger or content provision service administrator or chat room operator (hereinafter referred to as "administrator") specifies a chat room 410, 411 where to present content. The server 10 may refer to a chat room title 410 or a chat room identifier 411 to specify the chat room. Information 410 and 411 for specifying a chat room where to present content may be input directly into a terminal by the administrator or may be automatically input and provided by the server.

In addition, the administrator may set whether to apply a function 420 of receiving content related to a specific keyword or theme through the chat room.

In addition, the administrator may input information 430 about a keyword or theme of the content to be presented and provide the information to the server 10. The validity of the keyword or theme may be verified using a separate ID or identifier 440.

In addition, the administrator may input a condition 450 for presenting content through the chat room and provide the input result to the server 10. The condition for presenting content may be determined in various ways.

For example, the condition for presenting content may be determined based on predetermined time information. For example, a specific time, such as 10 a.m. every morning, may be set to present content through a chat room at the specific time.

In addition, the condition for presenting content may be determined based on a predetermined time interval. For example, a time interval rule, such as presenting content at two-hour intervals between 9 AM and 5 PM, may be set to deliver content through a chat room at the corresponding time interval.

In addition, the condition for presenting content may be based on the occurrence, progression, or termination of a predetermined event. As shown in FIG. 4, when a predetermined event is a specific sports game, content is presented 30 minutes after the game ends.

In addition, the condition for presenting content may relate to whether content searched in operation S120 satisfies a predefined criterion. As shown in FIG. 4, when the content is news article, the content is presented when 30 newly searched news articles have accumulated.

In some cases, the condition for presenting content may not be input directly by the administrator, but may be determined in a predetermined manner based on a keyword or theme of a content or chat room. For example, in the case of a sports-themed content, the content may be set to be presented 30 minutes after the end of the game, and in the case of a drama-themed content, the content may be set to be presented 60 minutes after the end of a drama. In addition, in the case of a weather-themed chat room, content may be set to be presented every morning at 8 am. In addition, in the case of content related to politics of a specific theme, the content may be set to be presented when 30 related news articles have accumulated.

Figure 5:
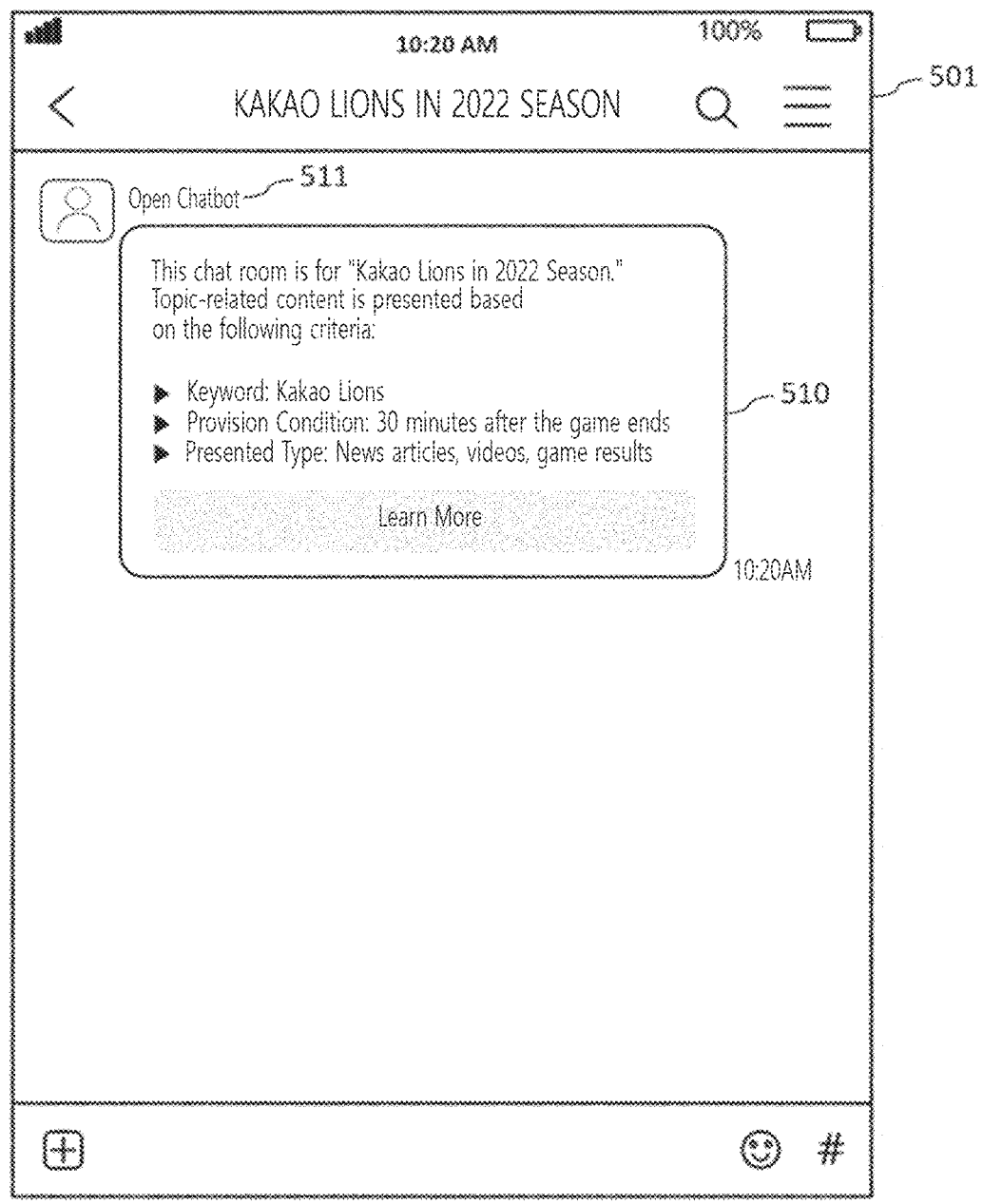
FIG. 5 illustrates an example screen, on which information about a keyword or theme of content to be presented through a chat room and information about a condition for receiving content are displayed on a user terminal.

FIG. 5 illustrates an example screen, on which information about a keyword or theme of content to be presented through a chat room and information about a condition for receiving content are displayed on a user terminal.

Referring to FIG. 5, a message 510 in a chat room 501 displayed on a user terminal shows that the content keyword is "Kakao Lions," the condition for presenting content is "30 minutes after the game ends," and the type of content presented is "news articles, videos, game results." The content may be presented in the form of a message from a chatbot 511 in the chat room.

Figure 6:
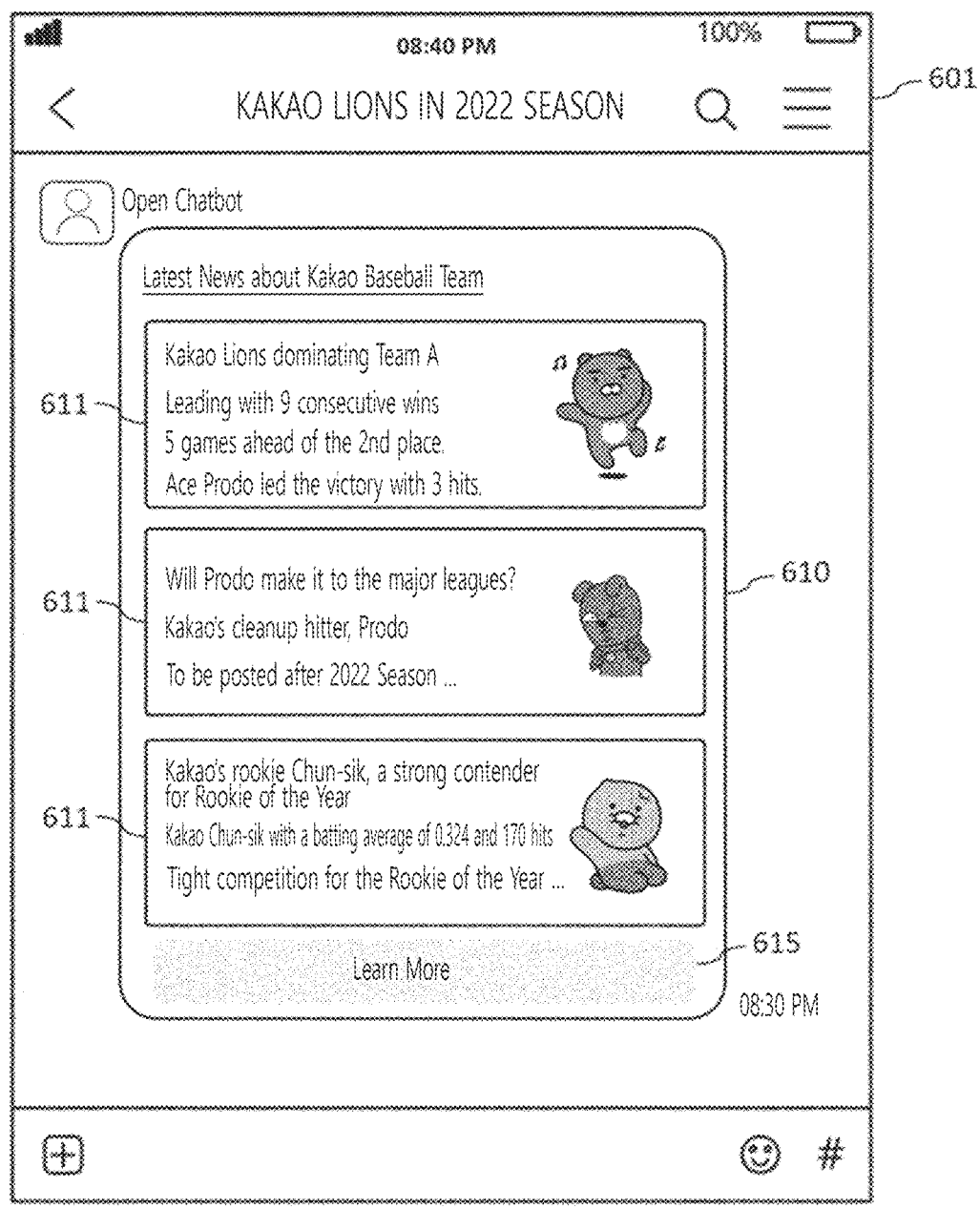
FIG. 6 illustrates an example screen showing content displayed through a chat room on a user terminal.

FIG. 6 illustrates an example screen showing content displayed through a chat room on a user terminal.

Referring to FIG. 6, content 611 is displayed in the form of a message 610 in a chat room 601 on a user terminal. In the example screen shown in FIG. 6, the presented content 611 may correspond to the news article type.

The content 611 of the news article type may be presented through the message format 610 determined based on news articles. As shown in FIG. 6, in the message format 610 determined based on news articles, a plurality of news articles 611 may be arranged in a predetermined form and a "Learn More" interface 615 for viewing additional news articles may be included.

Figure 7:
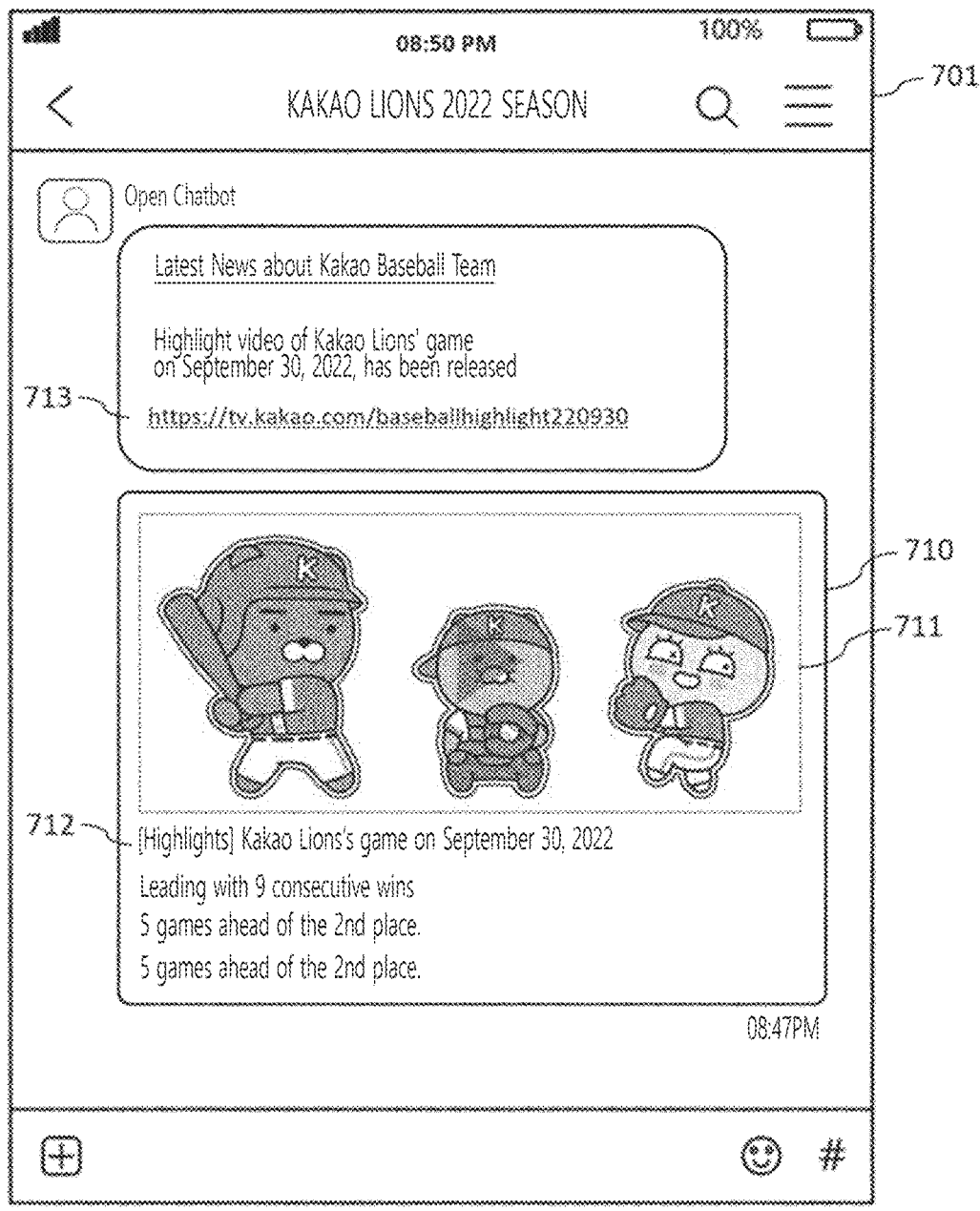
FIG. 7 illustrates an example screen displaying content of a different type from that shown in FIG. 6 through a chat room on a user terminal.

FIG. 7 illustrates an example screen displaying content of a different type from that shown in FIG. 6 through a chat room on a user terminal.

Referring to FIG. 7, content 711 is displayed in the form of a message 710 in a chat room 701 displayed on a user terminal. In the example screen shown in FIG. 7, the content 711 may correspond to a video type.

This content 711 of the video type may be presented through a message format 710 determined based on video content. As shown in FIG. 7, the message format 710 determined based on video content may include a preview window 711 for playing a video, a description area 712 regarding the video, and a link URL address area 713 to link to the video.

Figure 8:
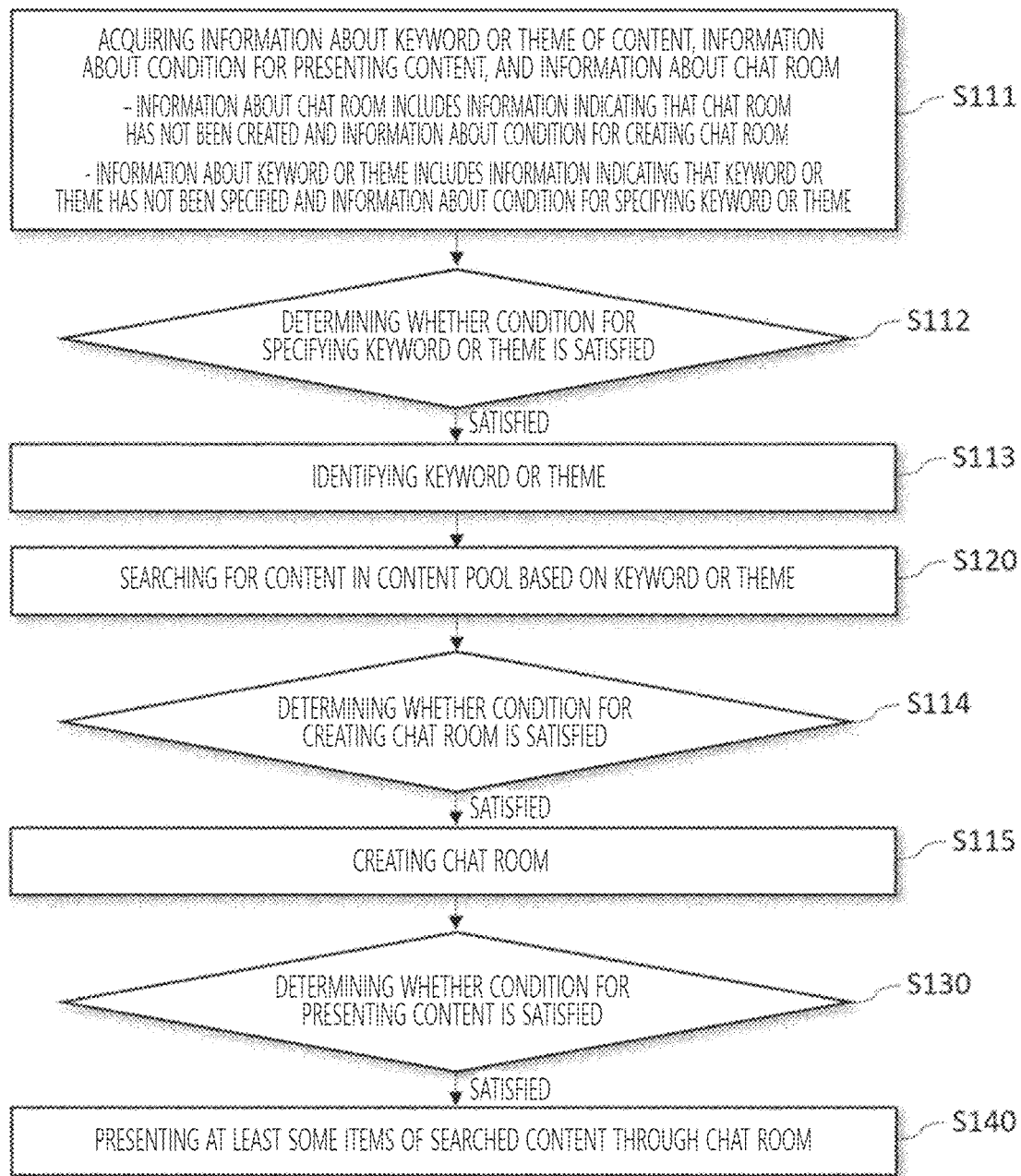
FIG. 8 is a flowchart of the operation of a server according to another embodiment of the present disclosure.

FIG. 8 is a flowchart of the operation of the server 10 according to another embodiment of the present disclosure.

The exemplary embodiment described with reference to FIG. 8 will focuses on the differences from the embodiments described above with reference to FIGS. 1 to 7.

In operation S111, the server 10 acquires information about a keyword or theme of content, information about a condition for presenting content, and information about a chat room.

When operation S111 is performed, a chat room where to present the content may not have been created yet. In this case, the information about the chat room may include information that the chat room has not yet been created. Also, the information about the chat room may include information about a chat room creation condition. The information about the chat room creation condition may be determined in various ways.

After operation S111, operation S114 of determining whether the chat room creation condition is satisfied and operation S115 of creating a chat room are performed. The order in which steps S114 and S115 are performed may vary depending on the chat room creation condition.

For example, the chat room creation condition may be a specific point in time, and the specific point in time may be a point in time before operation S120 is performed. In this case, unlike what is shown in FIG. 8, operation S114 of determining whether the chat room creation condition is satisfied and operation S115 of creating a chat room may be performed before operation S120 of searching for content.

As another example, the chat room creation condition may relate to whether the content searched in operation S120 satisfies a predefined criterion. Here, the predefined criterion may relate to at least one of the following: a number items, creation frequency, and importance of the searched content. For example, the chat room creation condition may be that a chat room is created when 20 or more items of content are searched within 30 minutes in operation S120. A high content creation frequency indicates a high interest in content related to a particular keyword or theme or a high likelihood of a new event occurring. In the case of the high interest of content or high likelihood of a new event, there is a greater need to create content related to the corresponding keyword or theme. In this example, as shown in FIG. 8. it is preferable that operation S144 of determining whether the chat room creation condition is satisfied is performed after operation S120 of searching for content is performed. When it is determined that the chat room creation condition is satisfied in operation S114, operation S115 is performed.

In some cases, any keyword or theme may not have been specified when operation S111 is performed. In this case, the information about a keyword or theme may include information indicating that any keyword or theme has not yet been specified. The information about the keyword or theme may include information about a condition for specifying a keyword or theme. The condition for specifying a keyword or theme may be determined in various ways.

After operation S111, operation S112 of determining whether the condition for specifying a keyword or theme is satisfied and operation S113 of identifying the keyword or theme are performed. The order in which operations S112 and S113 are performed may vary depending on the condition for specifying a keyword or theme. However, since operation S120 of searching for content is typically carried out only when the keyword or theme of content is specified in operation S113, operations S112 and S113 are usually performed before operation S120.

For example, the condition for specifying a keyword or theme may be that the keyword's search ranking increase satisfies a predefined criterion. In this case, the server 10 may receive information about a search word's ranking from a search server 10, determine in operation S112 whether the search word's ranking satisfies a predefined criterion, and, if so, identify the search word as a keyword or theme of the content in operation S113.

As another example, the condition for specifying a keyword or theme may be a special weather report provided by the meteorological agency. In this case, the server 10 may receive details of the occurrence and content of the special weather report from the meteorological agency, determine in operation S112 whether the details satisfies the condition for specifying a keyword or theme and, if so, identify the details as a keyword or theme of the content in operation S113.

In FIG. 8, it is assumed that a chat room has not yet been created and a keyword or theme has not yet been specified. However, in some cases, it is possible that a keyword or theme has been specified but a chat room has not yet been created. Furthermore, conversely, it is also possible that a chat room has been created, but a keyword or topic has not yet been specified.

Figure 9:
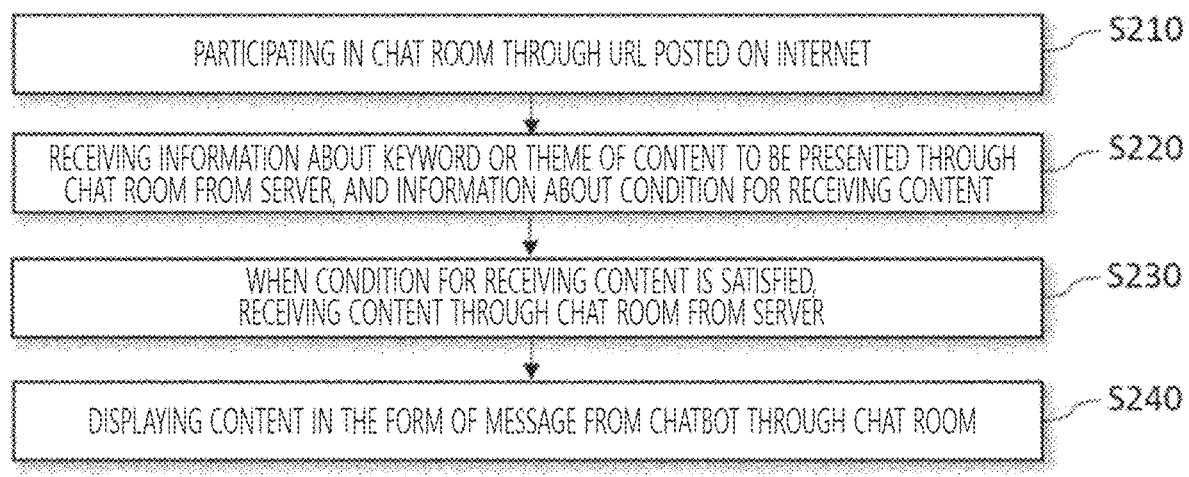
FIG. 9 is a flowchart of the operation of a user terminal according to an embodiment of the present disclosure.

FIG. 9 is a flowchart of the operation of a user terminal according to an embodiment of the present disclosure.

The embodiment described with reference to FIG. 9 explains the embodiments described with reference to FIGS. 1 to 8 from the perspective of a user terminal. Therefore, when explaining the embodiment with reference to FIG. 9, some of the redundant content that has already been described above with reference to FIGS. 1 to 8 will be omitted.

In operation S210, the user terminal 20 participates in a chat room through a URL posted on the Internet. The URL posted on the Internet may be linked to a specific interface. FIG. 3 shows a screen with such an interface for participating in a chat room. In addition to using an URL, the user terminal 20 may also participate in a chat room through a messenger service application.

In operation S220, the user terminal 20 may receive information about a keyword or theme of content to be presented through the chat room and information about a condition for receiving content from the server 10. In addition, the user terminal 20 may display the information about the keyword or theme of the content and the information about the condition for receiving content. FIG. 5 shows a screen where such information is displayed through a chat room.

In operation S230, when the condition for receiving content is satisfied, the user terminal 20 receives the content from the server 10 through the chat room. In operation S240, the user terminal 20 displays the content through the chat room. The content may be displayed in the form of a message from a chatbot in the chat room. FIGS. 6 and 7 show screens where such content is displayed through a chat room.

According to the above-described method, it is possible for a user to easily receive content related to a specific keyword and them simply by participating in a chat room. In addition, since the content is presented through a chat room, it is possible to easily receive a content delivery notification and access the content through a convenient service.

In particular, in the present disclosure, a chat room where content is presented may not be a chat room operated for the sole purpose of content delivery, but may be a chat room where a plurality of participants can discuss a keyword or theme of the chat room. Here, when the content is presented to the chat room using the above-described method, continuous conversations may occur among the plurality of participants based on the presented content.

In the present disclosure, it is possible to easily present content related to a specific keyword or theme to a user through a chat room.

In addition, in the present disclosure, it is possible to present content in a highly effective and readable manner by applying a customized format based on a type of the content.

The technical features disclosed in each embodiment of the present disclosure are not limited to a corresponding embodiment, and unless incompatible with each other, the technical features disclosed in each embodiment may be applied in combination to other embodiments.

Therefore, although each embodiment is described mainly about an individual technical feature, the technical features of the embodiments of the present disclosure may be applied in combination, unless incompatible with each other.

The present disclosure is not limited to the above-described embodiments and the accompanying drawings, and various modifications and changes may be made in view of a person skilled in the art to which the present disclosure pertains. Therefore, the scope of the present disclosure should be determined by the scope of the appended claims, and equivalents thereof.

What is claimed is:

1. A method in which a server presents content through a chat room, the method comprising:
acquiring information about a keyword or theme of the content, information about a condition for presenting the content, and information about the chat room, wherein the chat room is related to the keyword or theme and a plurality of users are able to participate in the chat room;
providing the chat room to a user terminal in association with the information about the keyword or theme of the content;
searching for the content in a content pool based on the keyword or theme; and
in response to the condition for presenting the content being satisfied, presenting at least some items of the searched content to the user terminal through the chat room, wherein:
the content corresponds to one of a plurality of types, and
in presenting the at least some items of the searched content, the content is presented through a message format determined based on a type of the content.

2. The method of claim 1, wherein the information about the condition for presenting the content comprises at least one of predetermined time information or time interval information.

3. The method of claim 1, wherein the information about the condition for presenting the content is based on occurrence, passage or termination of a predetermined event.

4. The method of claim 1, wherein the information about the condition for presenting the content relates to whether the searched content in the searching satisfies a predefined criterion.

5. The method of claim 4, wherein the predefined criterion relates to at least one of the following: a number of items, creation frequency, or importance of the searched content.

6. The method of claim 1, wherein:
information about the type of the content is further acquired, and
the content is searched further based on the type.

7. The method of claim 1, wherein:
the chat room is a chat room where the plurality of users are able to participate through a URL posted on the Internet, and
the chat room comprises a plurality of chat rooms corresponding to one URL.

8. The method of claim 7, wherein the plurality of chat rooms are determined based on a time when the plurality of users participate through the one URL or a number of participants in other chat rooms.

9. The method of claim 1, wherein in presenting the at least some items of the searched content, the content is presented in the form of a message from a chatbot in the chat room.

10. The method of claim 1, wherein:
the information about the chat room comprises information indicating that the chat room has not been created and information about a condition for creating the chat room,
the method further comprises:
determining whether the condition for creating the chat room is satisfied; and
in response to the condition for creating the chat room being satisfied, creating the chat room.

11. The method of claim 10, wherein the condition for creating the chat room relates to whether the content searched in the searching satisfies a predefined criterion.

12. The method of claim 11, wherein the predefined criterion relates to at least one of the following: a number of items, creation frequency, or importance of the searched content.

13. The method of claim 10, wherein:
the information about the keyword or theme comprises information indicating that the keyword or theme has not yet been specified and information about a condition for specifying the keyword or theme, and
the method further comprises:
determining whether the condition for specifying the keyword or theme is satisfied; and
in response to the condition for specifying the keyword or theme being satisfied, identifying the keyword or theme.

14. A method in which a user terminal receives content through a chat room, wherein the content is content searched by a server in a content pool based on a predetermined keyword or theme, the method comprising:
displaying the chat room in association with the information about a keyword or theme of the content;
participating in the chat room through a uniform resource locator (URL) posted on the Internet, wherein the chat room is related to the keyword or theme of the content, and a plurality of users are able to participate in the chat room;
receiving the information about the keyword or theme of the content to be presented through the chat room and information about a condition for receiving the content from the server;
in response to the condition for receiving the content being satisfied, receiving the content from the server through the chat room; and
displaying the content in the form of a message from a chatbot through the chat room.

15. The method of claim 14, wherein:
the content corresponds to one of a plurality of types, and
the content is displayed based on a message format determined according to a type to the content.

16. A user terminal for receiving content through a chat room, wherein the content is content searched by a server in a content pool based on a predetermined keyword or theme, the user terminal comprising:
a memory storing instructions, and
a processor configured to execute the instructions to:
display the chat room in association with the information about a keyword or theme of the content;
participate in the chat room through a URL posted on the Internet, wherein the chat room is related to the keyword or theme of the content and a plurality of users are able to participate in the chat room;
receive the information about the keyword or theme of the content to be presented through the chat room and information about a condition for receiving the content from the server;
in response to the condition for receiving the content being satisfied, receive the content from the server through the chat room; and
display the content in the form of a message from a chatbot through the chat room.

* * * * *